United States Patent
Moriyama et al.

(10) Patent No.: US 7,683,117 B2
(45) Date of Patent: Mar. 23, 2010

(54) RESIN COMPOSITION, RESIN MOLD AND METHOD FOR PRODUCING THE SAME

(75) Inventors: Masahiro Moriyama, Kanagawa (JP); Kenji Yao, Kanagawa (JP); Seiichi Takagi, Kanagawa (JP); Masayuki Okoshi, Kanagawa (JP); Fumiyuki Suzuki, Tokyo (JP); Tadashi Mochizuki, Kanagawa (JP); Hidetoshi Kawasaki, Kanagawa (JP)

(73) Assignees: Fuji Xerox Co., Ltd., Tokyo (JP); Fujifilm Corporation, Tokyo (JP)

( * ) Notice: Subject to any disclaimer, the term of this patent is extended or adjusted under 35 U.S.C. 154(b) by 90 days.

(21) Appl. No.: 12/010,974

(22) Filed: Jan. 31, 2008

(65) Prior Publication Data

US 2008/0188597 A1    Aug. 7, 2008

(30) Foreign Application Priority Data

Feb. 2, 2007  (JP) .............................. 2007-024558
Dec. 12, 2007  (JP) .............................. 2007-321068

(51) Int. Cl.
*C08K 5/521*  (2006.01)
*C08K 3/32*  (2006.01)

(52) U.S. Cl. ....................................... 524/416; 524/127
(58) Field of Classification Search ................ 524/416, 524/127
See application file for complete search history.

(56) References Cited

U.S. PATENT DOCUMENTS

| 5,585,434 | A | * | 12/1996 | DeNicola et al. | ............... | 525/67 |
| 2006/0142421 | A1 | * | 6/2006 | Ihara et al. | .................. | 523/205 |
| 2008/0071008 | A1 | * | 3/2008 | Smillie et al. | ............... | 523/201 |
| 2008/0262151 | A1 | * | 10/2008 | Ishii et al. | .................... | 524/599 |

FOREIGN PATENT DOCUMENTS

| JP | A-2003-192929 | 7/2003 |
| JP | A-2004-027079 | 1/2004 |
| JP | A-2004-190025 | 7/2004 |
| JP | 2006-111858 A * | 4/2006 |

* cited by examiner

*Primary Examiner*—Peter Szekely
(74) *Attorney, Agent, or Firm*—Oliff & Berridge, PLC

(57) ABSTRACT

A resin composition includes an aliphatic polyester; a second polymer compound other than the aliphatic polyester; and an organic phosphoric acid compound that has a phosphorus content of about 20% by mass or more.

12 Claims, 1 Drawing Sheet

FIGURE
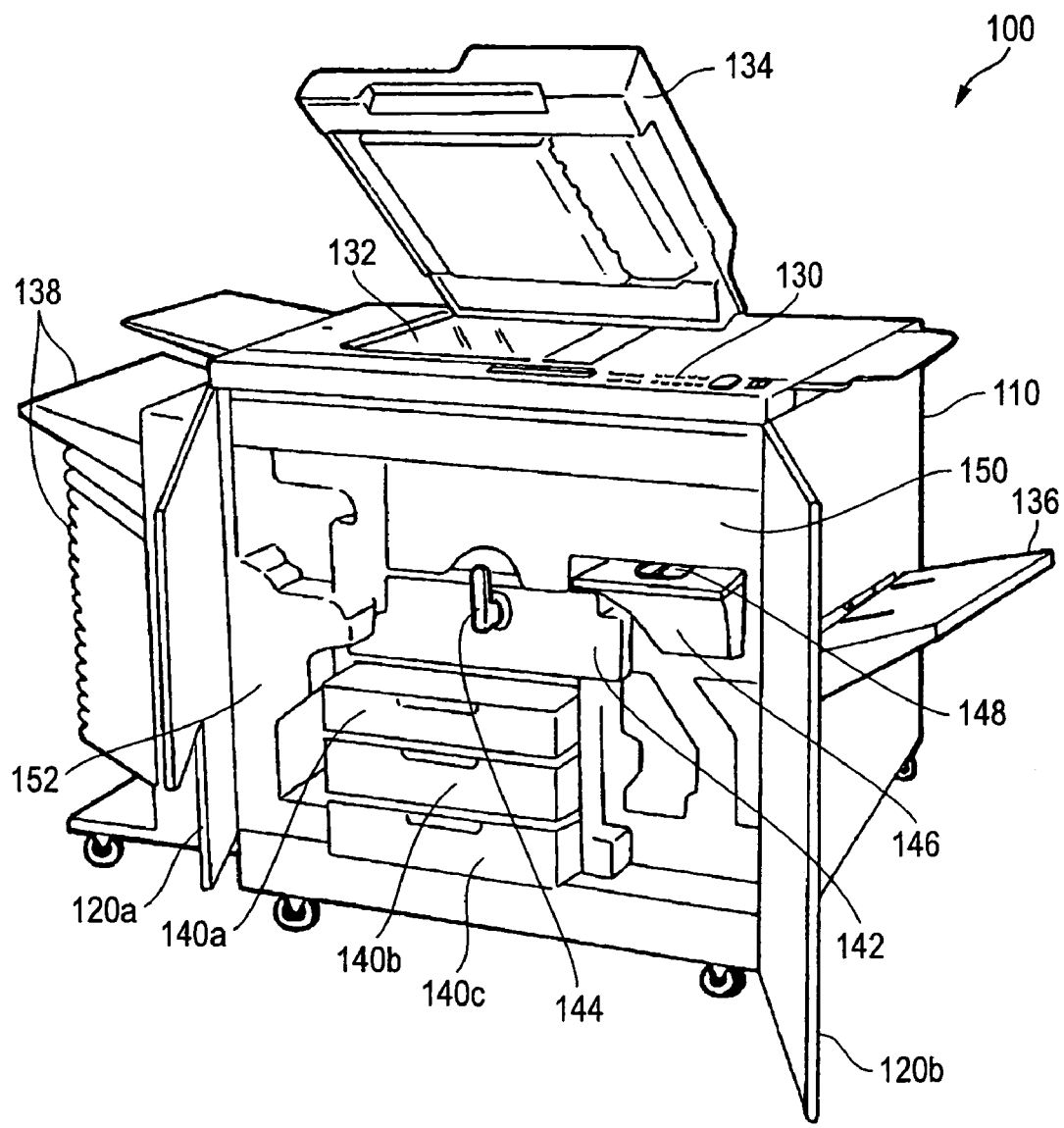

RESIN COMPOSITION, RESIN MOLD AND METHOD FOR PRODUCING THE SAME

CROSS-REFERENCE TO RELATED APPLICATIONS

This application is based on and claims priority under 35 USC 119 from Japanese Patent Application Nos. 2007-024558 filed on Feb. 2, 2007 and 2007-321068 filed on Dec. 12, 2007.

BACKGROUND

1. Technical Field

The present invention relates to a resin composition, a resin mold and a method for producing the same.

2. Related Art

In recent years, biodegradable resins such as aliphatic polyesters have attracted attention as biomass materials from the viewpoint of environmental protection.

According to an aspect of the invention, there is provided a resin composition including: an aliphatic polyester; a second polymer compound other than the aliphatic polyester; and an organic phosphoric acid compound that has a phosphorus content of about 20% by mass or more.

BRIEF DESCRIPTION OF THE DRAWINGS

Exemplary embodiment(s) of the present invention will be described in detail based on the following FIGURE, wherein:

FIGURE is an external perspective view showing an image forming apparatus provided with a casing and parts according to an exemplary embodiment of a resin mold of the invention.

DETAILED DESCRIPTION

Preferred exemplary embodiments of the invention will be described in detail below, with reference to a drawing in some cases.

(Resin Composition)

The composition according to the present exemplary embodiment includes an aliphatic polyester, a second polymer compound other than the aliphatic polyester, and an organic phosphoric acid compound having a phosphorus content of about 20% by mass or more. The phosphorus content in the organic phosphoric acid compound as used herein means the mass ratio of elemental phosphorus to the total mass of the organic phosphoric acid compound. The phosphorus content can be measured using, for example, a fluorescent X-ray or the like.

Although the aliphatic polyester is not particularly limited, an aliphatic polyester having biogradability is preferred, and a plant-derived aliphatic polyester is more preferred. Specific examples thereof include polylactic acid, poly(3-hydroxybutyric acid), polybutylene succinate, polybutylene adipate, polyethylene succinate, polyethylene adipate, polypropylene succinate, polypropylene adipate, polyhexylene succinate, polyhexylene adipate and the like. Of these aliphatic polyesters, polylactic acid is preferred from the view point of the balance between flame retardancy and mechanical strength (particularly, impact-resistant strength). These aliphatic polyesters may be used either alone or as a combination of two or more thereof. Further, a copolymer of two or more of these aliphatic polyesters may also be used.

The weight average molecular weight of the aliphatic polyester is preferably from 5,000 to 200,000, and more preferably from 10,000 to 120,000. Further, the number average molecular weight of the aliphatic polyester is preferably from 3,000 to 10,000, and more preferably from 5,000 to 70,000. When the weight average molecular weight and the number average molecular weight of the aliphatic polyester are each lower than the above-mentioned lower limit values, impact-resistant strength tends to become insufficient. Further, exceeding the above-mentioned upper limit values results in the tendency of formability to become insufficient.

Although the content of the aliphatic polyester is not particularly limited, it is preferably from 20% by mass to 80% by mass, and more preferably from 30% by mass to 70% by mass, on the basis of the total amount of the resin composition. When the content of the aliphatic polyester is less than the above-mentioned lower limit value, the degree of plant and recyclability decrease to cause the tendency of environmental load to increase. Further, exceeding the above-mentioned upper limit values results in the tendency of mechanical strength and heat resistance to become insufficient.

Further, the second polymer compounds include, specifically, a polycarbonate, a polyarylate, an aromatic polyester, a polyamide, a polyimide, polymethyl methacrylate, polystyrene, polyoxymethylene, polyphenylene oxide, an acrylonitrile-butadiene-styrene resin (ABS resin), a polyacetal, polybutylene terephthalate, a polyether ketone and the like. Of these, the polycarbonate and the ABS resin are preferred, and the polycarbonate is particularly preferred, because a higher advantage of improving impact-resistant strength is obtained. These second polymer compounds may be used either alone or as a combination of two or more thereof. Further, a copolymer of two or more of these polymer compounds may also be used as the second polymer compound.

Furthermore, as the second polymer compound, one having a glass transition point of 80° C. or higher is preferred, and one having a glass transition point of 100° C. or higher is more preferred, from the viewpoints of improved compatibility in melt kneading and appearance of the mold. The glass transition point of the second polymer compound means the glass transition point measured in the following manner. That is to say, a thermal spectrum is measured with a differential calorimeter (differential scanning calorimeter, DSC-60, manufactured by Shimadzu Corporation) under conditions of a rate of temperature increase of 10° C. per minute, and the intermediate value (Tgm) between two shoulder values determined from a glass transition-derived peak by a tangent method is taken as the glass transition point.

Moreover, the weight average molecular weight of the second polymer compound is preferably from 5,000 to 100,000, and more preferably from 10,000 to 80,000. Further, the number average molecular weight of the second polymer compound is preferably from 2,500 to 40,000, and more preferably from 3,000 to 30,000. When the weight average molecular weight and the number average molecular weight of the second polymer compound are each lower than the above-mentioned lower limit values, impact-resistant strength tends to become insufficient. Further, exceeding the above-mentioned upper limit values results in the tendency of formability to become insufficient. The weight average molecular weight and the number average molecular weight of the second polymer compound in the resin composition mean the weight average molecular weight and the number average molecular weight measured for the second polymer compound with a gel permeation chromatograph. As the gel permeation chromatograph, there can be used an HLC-8220 GPC manufactured by Tosoh Corporation. In addition, when the weight average molecular weight and the number average molecular weight are determined for the second polymer compound in the resin composition, a sample for measurement is dissolved in deuterated chloroform at a concentration of 0.1% by mass, and the weight average molecular weight and the number average molecular weight can be measured for the second polymer compound separated from the solution, with a gel permeation chromatograph.

The content of the second polymer compound is preferably from 5% by mass to 70% by mass, and more preferably from 20% by mass to 50% by mass, on the basis of the total amount of the resin composition. When the content of the second polymer compound is less than the above-mentioned lower limit value, heat resistance tends to decrease. Further, exceeding the above-mentioned upper limit values results in an increase in forming temperature to cause the tendency of mechanical strength of a resin mold to be obtained to decrease.

The organic phosphoric acid compounds having a phosphorus content of about 20% by mass or more (hereinafter also sometimes simply referred to as the "organic phosphoric acid compounds") include a phosphate, a condensed phosphate, a polyphosphate, red phosphorus and the like. Of these, the polyphosphate is preferred because a higher advantage of improving impact-resistant strength is obtained, and specifically, ammonium polyphosphate is more preferred. These organic phosphoric acid compounds may be used either alone or as a combination of two or more thereof.

Further, from the viewpoint of more improving impact-resistant strength while realizing sufficient flame retadancy, it is preferred that the organic phosphoric acid compound has a molecular weight of from about 80,000 to about 150,000. In addition, the molecular weight of the organic phosphoric acid compound means the molecular weight of a structural unit multiplied by the number of repeating units.

When the resin composition of this exemplary embodiment contains ammonium polyphosphate as the organic phosphoric acid compound, the number of repeating units of ammonium polyphosphate is preferably about 800 or more, and more preferably from about 800 to about 1,000. By allowing such ammonium polyphosphate to be contained, impact-resistant strength can be more improved while realizing sufficient flame retardancy of the resin composition.

Further, ammonium polyphosphate used in this exemplary embodiment is required to have a phosphorus content of about 20% by mass or more. From the viewpoint of the compatibility of flame retardancy and mechanical strength (particularly, impact-resistant strength) in a higher level, the phosphorus content is more preferably 27% by mass or more, and still more preferably 29% by mass or less. The phosphorus content in ammonium polyphosphate is preferably 50% by mass or less, more preferably 40% by mass or less, and still more preferably 30% by mass or less. When the phosphorus content in ammonium polyphosphate exceeds 50% by mass, phosphoric acid volatilizes at the time of kneading and forming to accelerate decomposition of the aliphatic polyester and the second polymer compound, resulting in the tendency of mechanical strength to decrease.

The content of the organic phosphoric acid compound is preferably from 3% by mass to 20% by mass, and more preferably from 5% by mass to 15% by mass, on the basis of the total amount of the resin composition. When the content of the organic phosphoric acid compound is less than the above-mentioned lower limit value, flame retardancy and mechanical strength (particularly, impact-resistant strength) tends to become difficult to be compatible with each other. Further, exceeding the above-mentioned upper limit value results in the generation of a phosphorus-containing gas when the temperature of the use environment as well as the forming process increases, which causes an excessive rise in temperature of the resin composition in some cases.

In the resin composition according to this exemplary embodiment, the aliphatic polyester, the second polymer compound other than the aliphatic polyester, and the organic phosphoric acid compound having a phosphorus content of about 20% by mass or more are contained as essential components, thereby allowing mechanical strength and flame retardancy to be compatible with each other in a high level. The present inventors presume that the reason why such an advantage is obtained by the above-mentioned constitution is that the organic phosphoric acid compound having a phosphorus content of about 20% by mass or more chemically acts on both the aliphatic polyester and the second polymer compound to improve the compatibility of both.

Further, the resin composition according to this exemplary embodiment has the excellent characteristics as described above, so that it is also useful in that the content of the flame retardant can be reduced while keeping flame retadancy in a high level. For example, in the case of a resin composition not having the above-mentioned constitution, a large amount (for example, about 30% by mass) of the flame retardant is required to be contained, in order to achieve UL-V2 in a flame retardancy test. However, in this exemplary embodiment, UL-V2 can be achieved even when the content of the organic phosphoric acid compound is reduced to about 3% by mass.

In addition, the resin composition according to this exemplary embodiment may further contain a flame retardant (hereinafter referred to as an "additional flame retardant" for convenience) other than the above-mentioned organic phosphoric acid compound, as long as its advantage is not impaired. The additional flame retardants include, for example, a phosphorus-based flame retardant other than the aforementioned organic phosphoric acid compound, a bromine-based flame retardant, a silicone-based flame retardant, an inorganic particle-based flame retardant and the like. Of these, a compound represented by the following general formula (I) is preferably used from the viewpoint of improving solvent resistance.

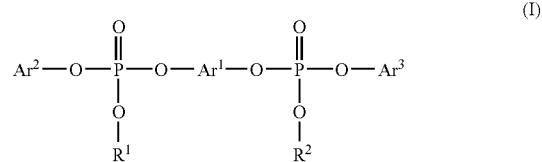

(I)

wherein $Ar^1$ represents a substituted or unsubstituted arylene group, a substituted or unsubstituted biphenylene group or a substituted or unsubstituted bisphenol-typed arylene group, $Ar^2$ and $Ar^3$ each independently represents a substituted or unsubstituted aryl group, and $R^1$ and $R^2$ each independently represents a substituted or unsubstituted alkyl group having 1 to 10 carbon atoms or a substituted or unsubstituted aryl group.

Specific examples of such compounds include PX-200 (manufactured by Daihachi Chemical Industry Co., Ltd.) represented by the following structural formula (I-1) and CR-741 (manufactured by Daihachi Chemical Industry Co., Ltd.) represented by the following structural formula (I-2).

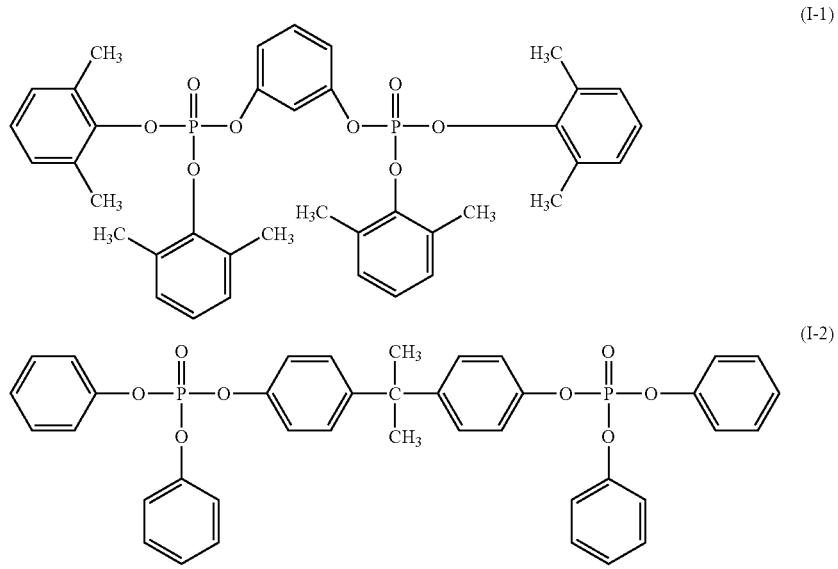

From the viewpoint of the compatibility of flame retardancy and mechanical strength, the content of the additional flame retardant is preferably 10% by mass or less, and more preferably 5% by mass or less, on the basis of the total amount of the resin composition. Further, the content of the additional flame retardant is preferably from 5% by mass to 50% by mass, and more preferably from 10% by mass to 40% by mass, on the basis of the organic phosphoric acid compound.

The resin composition according to this exemplary embodiment may be composed of the aliphatic polyester, the second polymer compound and the organic phosphoric acid compound having a phosphorus content of about 20% by mass or more. However, it is preferred to further contain an elastomer such as an elastomer having a core-shell structure of a core and a shell, an elastomer of a structure having no shell or an elastomer of a branched structure having a side chain (hereinafter sometimes collectively simply referred as an "elastomer"), because mechanical strength and flame retardancy are compatible with each other in a higher level, and particularly, impact-resistant strength can be more improved. Materials for the core of the elastomer having a core-shell structure include butadiene, styrene, methyl methacrylate, acrylonitrile, vinyl acetate and the like. Further, materials for the shell include an alkyl acrylate, an alkyl methacrylate, a polysiloxane and the like. These can be appropriately selected depending on the kind of aliphatic polyester and second polymer compound. Modification of the core in the elastomer having a core-shell structure may be performed by graft polymerization, or by immersing the core in a solution in which a material for the shell is dissolved in a solvent.

By the way, the present inventors consider that the reason why the above-mentioned advantage is obtained by incorporating the elastomer in the resin composition according to this exemplary embodiment is that the organic phosphoric acid compound having a high phosphorus content according to this exemplary embodiment also acts as a dispersing aid to disperse the elastomer more homogeneously, thereby effectively exhibiting the advantage of improving impact-resistant strength by the elastomer.

The average particle size of the elastomer is preferably from 0.5 μm to 50 μm, and more preferably from 2 μm to 20 μm. When the average particle size of the elastomer is less than 0.5 μm, the advantage of improving impact-resistant strength tends to become insufficient. Further, exceeding 50 μm results in the tendency of dispersibility of the elastomer in the resin composition to decrease, which sometimes rather causes a decrease in impact-resistant strength by adding the elastomer to the resin composition.

The elastomers are commercially available, for example, as "METABLEN S-2001", "METABLEN SRK200" and "METABLEN SX-005" (trade names, the above are manufactured by Mitsubishi Rayon Co., Ltd.) of the silicone-acrylic rubber family, "METABLEN W-450A" (trade name, manufactured by Mitsubishi Rayon Co., Ltd.) of the acrylic rubber family, "METABLEN C-223A", "METABLEN C-215A", "METABLEN C-202" and "METABLEN 901" (trade names, manufactured by Mitsubishi Rayon Co., Ltd.) of the methacrylic acid-butadiene-styrene family, "JSR SL552" and "JSR 574" (trade names, manufactured by JSR Corporation) of the styrene-butadiene family, and the like.

In the resin composition according to this exemplary embodiment, from the viewpoint of allowing mechanical strength and flame retardancy to be compatible with each other in a higher level, an elastomer having a core-shell structure of a core derived from butadiene and a shell derived from an acrylic compound and an elastomer having a core-shell structure of a core derived from a silicone rubber and a shell derived from an acrylic compound are preferred. In terms of inhibition of separation at an interface in the resin composition and cracking derived therefrom, an elastomer having a core-shell structure of a core derived from butadiene and a shell derived from an acrylic compound is more preferably used. As the elastomer having a core-shell structure of a core derived from butadiene and a shell derived from an acrylic compound, preferred is an acryl graft butadiene rubber in terms of easy formation of chemical bonds with all of the aliphatic polyester, the second polymer compound and the organic phosphoric acid compound having a phosphorus content of about 20% by mass or more and strong adhesion between the core and the shell.

Further, the resin composition according to this exemplary embodiment may further contain an additive such as a filler, an antioxidant, a toughening agent, a compatibilizer, a weatherproofing agent or a hydrolysis-preventing agent, a catalyst or the like, as needed. The contents of these additives and the catalyst are each preferably 10% by mass or less on the basis of the total amount of the resin mold.

Preferred examples of the above-mentioned fillers include a filler having an aspect ratio of 3 to 20. Specifically, preferred is a natural filler such as kenaf, bamboo fiber, mica, walnut shells or coffee shells, having an aspect ratio of 3 to 20. The use of the filler having an aspect ratio of 3 to 20 can improve Rockwell hardness and plane impact strength while allowing mechanical strength and flame retardancy to be compatible with each other. The present inventors presume that the reason for this is that when the weight average molecular weight of the second polymer compound is smaller than that of the aliphatic polyester, the filler having an aspect ratio of 3 to 20 crystallizes the aliphatic polyester, and that the second polymer compound encapsulates the acicular crystallized matter.

Other preferred examples of the above-mentioned fillers include at least one selected from the group consisting of carbon nanotube and fullerene. The use of carbon nanotube or fullerene can improve resistance to hydrolysis while allowing mechanical strength and flame retardancy to be compatible with each other. The present inventors presume that the reason for this is that carbon nanotube or fullerene will react with terminal groups of the aliphatic polyester, the second polymer compound and the organic phosphoric acid compound.

From the viewpoint of allowing mechanical strength and flame retardancy to be compatible with each other in a higher level, particularly more improving impact-resistant strength, it is preferred that the resin composition according to this exemplary embodiment contains the hydrolysis-preventing agent. The hydrolysis-preventing agents include compounds having reactivity to active hydrogen in the resin composition, specifically a carbodiimide compound, an isocyanate compound such as a diisocyanate or a triisocyanate, a multifunctional hydroxy compound such as a hydroxy compound or a dihydroxy compound, a multifunctional carboxylic acid such as a dicarboxylic acid or a tricarboxylic acid and an ester derivative thereof, a multifunctional amine compound such as a diamine or a triamine, an oxazoline-based compound and the like. Of these, the carbodiimide compound and the isocyanate compound are preferred in terms of improving wet heat-resistant characteristics. Further, the carbodiimide compound is preferred in that it can be melt kneaded with a resin such as the aliphatic polyester, and in that the sufficient advantage of preventing hydrolysis is obtained by addition thereof in small amounts.

Further, preferred is the resin composition according to this exemplary embodiment which gives a Charpy impact strength of 2.8 kJ/m$^2$ or more, when formed into the resin mold, and more preferred is one which gives a Charpy impact strength of 6 kJ/m$^2$ or more. The Charpy impact strength as used herein means one determined by the method based on the specification of ISO-179. The resin composition according to this exemplary embodiment which gives a Charpy impact strength of 3 kJ/m$^2$ or more is suitable particularly when used for casings of electronic devices.

Furthermore, preferred is the resin composition according to this exemplary embodiment which gives a flexural modulus of 1,500 MPa to 3,000 MPa, when formed into the resin mold. The flexural modulus as used herein means one determined by the method based on the specification of ISO-179. The resin composition according to this exemplary embodiment which gives a flexural modulus within the above-mentioned range is suitable particularly when the resin mold is used for covers having snap-fit portions.

(Resin Mold)

The resin mold according to a first exemplary embodiment of the invention contains the resin composition according to this exemplary embodiment described above. In the resin mold according to this exemplary embodiment, it becomes possible thereby to allow mechanical strength and flame retardancy to be compatible with each other in a high level, compared to a resin mold not having this constitution, even when a phosphorus-based flame retardant is contained. It can be said to be an extremely unexpected advantage that such an advantage is obtained, in view that a phosphorus-based flame retardant-containing aliphatic polyester resin is considered to be not necessarily suitable for uses requiring mechanical strength, because the phosphorus-based flame retardant can cause hydrolysis of the aliphatic polyester resin.

Further, in a second exemplary embodiment of the invention, the molecular weight distribution of the aliphatic polyester and the second polymer compound in the resin mold satisfies conditions represented by the following equation (1):

$$Mw(1)/Mn(1) \geq Mw(2)/Mn(2) \tag{1}$$

wherein $Mw(1)$ and $Mn(1)$ represent the weight average molecular weight and the number average molecular weight of the aliphatic polyester, respectively, and $Mw(2)$ and $Mn(2)$ represent the weight average molecular weight and the number average molecular weight of the second polymer compound, respectively.

Furthermore, in the second exemplary embodiment of the invention, it is preferred that the molecular weight distribution of the second polymer compound in the resin mold satisfies conditions represented by the following equation (2):

$$Mw(2)/Mn(2) \leq 2.5 \tag{2}$$

wherein $Mw(2)$ and $Mn(2)$ represent the weight average molecular weight and the number average molecular weight of the second polymer compound, respectively.

The aliphatic polyesters include but are not particularly limited to, for example, polybutylene succinate, polyethylene succinate, polybutylene adipate, polylactic acid, poly(3-hydroxybutyric acid) and the like. Of these aliphatic polyesters, polylactic acid is preferred from the viewpoint of the balance between flame retardancy and mechanical strength (particularly, impact-resistant strength). These aliphatic polyesters may be used either alone or as a combination of two or more thereof. Further, a copolymer of two or more of these aliphatic polyesters may also be used.

The ratio $Mw(1)/Mn(1)$ of the weight average molecular weight $Mw(1)$ to the number average molecular weight $Mn(1)$ of the aliphatic polyester is not particularly limited, as long as it satisfies the above-mentioned equation (1). However, it is preferably from 1.7 to 4.0, and more preferably from 2.1 to 3.5. Further, the weight average molecular weight $Mw(1)$ of the aliphatic polyester is preferably from 5,000 to 200,000, and more preferably from 10,000 to 120,000. Furthermore, the number average molecular weight $Mn(1)$ of the aliphatic polyester is preferably from 3,000 to 100,000, and more preferably from 5,000 to 70,000, in terms of formability and mechanical strength. When the weight average molecular weight $Mw(1)$ and the number average molecular weight $Mn(1)$ of the aliphatic polyester are each lower than the above-mentioned lower limit values, impact-resistant strength tends to become insufficient. Further, exceeding the above-mentioned upper limit values results in the tendency of formability to become insufficient.

Although the content of the aliphatic polyester is not particularly limited, it is preferably from 20% by mass to 80% by mass, and more preferably from 30% by mass to 70% by mass, on the basis of the total amount of the resin mold. When the content of the aliphatic polyester is less than 20% by mass, recyclability decrease to cause the tendency of environmental load to increase. Further, exceeding the above-mentioned upper limit values results in the tendency of mechanical strength and heat resistance to become insufficient.

Further, the second polymer compound other than the aliphatic polyester is not particularly limited, as long as the weight average molecular weight and the number average molecular weight thereof satisfy the conditions represented by the above-mentioned equation (1). Examples thereof include a polycarbonate, a polyester, polymethyl methacrylate, polystyrene, polypropylene, polyethylene, an acrylonitrile-butadiene-styrene resin (ABS resin) and the like. Of these, the polycarbonate and the ABS resin are preferred, because a higher advantage of improving impact-resistant strength is obtained. These second polymer compounds may be used either alone or as a combination of two or more thereof. Further, a copolymer of two or more of these polymer compounds may also be used as the second polymer compound.

Furthermore, the ratio $Mw(2)/Mn(2)$ of the weight average molecular weight $Mw(2)$ to the number average molecular weight $Mn(2)$ of the second polymer compound is preferably 2.5 or less as described above, more preferably from 1.5 to 2.5, and still more preferably from 1.7 to 2.3, in the resin mold, from the viewpoint of the balance between flame retardancy and mechanical strength (particularly, impact-resistant strength). In addition, when the resin mold contains two or more of the polymer compounds other than the aliphatic polyester, what is necessary is just that at least one of the polymer compounds other than the aliphatic polyester satisfies preferably the conditions represented by the above-mentioned equation (1), more preferably the conditions represented by the above-mentioned equations (1) and (2), and the other polymer compounds are not necessarily required to satisfy the conditions represented by the above-mentioned equations (1) and (2). However, it is preferred that all of the polymer compounds other than the aliphatic polyester satisfy the conditions represented by the above-mentioned equation (1), and it is more preferred that they satisfy the conditions represented by the above-mentioned equations (1) and (2), because flame retardancy and mechanical strength (particularly, impact-resistant strength) are compatible with each other in a higher level in a well-balanced state.

Moreover, the weight average molecular weight $Mw(2)$ of the second polymer compound is preferably from 5,000 to 100,000, and more preferably from 10,000 to 80,000. Further, the number average molecular weight $Mn(2)$ of the second polymer compound is preferably from 2,500 to 40,000, and more preferably from 3,000 to 30,000. When the weight average molecular weight $Mw(2)$ and the number average molecular weight $Mn(2)$ of the second polymer compound are each lower than the above-mentioned lower limit values, impact-resistant strength tends to become insufficient. Further, exceeding the above-mentioned upper limit values results in the tendency of formability to become insufficient.

The content of the second polymer compound is preferably from 10% by mass to 70% by mass, and more preferably from 20% by mass to 50% by mass, on the basis of the total amount of the resin mold. When the content of the second polymer compound is less than the above-mentioned lower limit value, heat resistance tends to decrease. Further, exceeding the above-mentioned upper limit values results in an increase in forming temperature to cause the tendency of mechanical strength of the mold to decrease.

Further, in this exemplary embodiment, the weight average molecular weight and the number average molecular weight of the aliphatic polyester and the second polymer compound mean the weight average molecular weight and the number average molecular weight measured with a gel permeation chromatograph for each of the aliphatic polyester and the second polymer compound separated by cooling the resin mold in a liquid nitrogen atmosphere, scraping a sample for measurement from a surface thereof, and dissolving the sample for measurement in deuterated chloroform at a concentration of 0.1% by mass. In the invention, an HLC-8220 GPC manufactured by Tosoh Corporation is used as the gel permeation chromatograph.

Furthermore, although the phosphorus content in the organic phosphoric acid compound according to this exemplary embodiment is required to be about 20% by mass or more, it is preferably about 27% by mass or more, and more preferably about 29% by mass or less. When the phosphorus content in the organic phosphoric acid compound is less than 20% by mass, flame retardancy and mechanical strength (particularly, impact—resistant strength) tends to become difficult to be compatible with each other. Further, the phosphorus content in the organic phosphoric acid compound is preferably about 50% by mass or less, more preferably about 40% by mass or less, and still more preferably about 30% by mass or less. When the phosphorus content in the organic phosphoric acid compound exceeds 50% by mass, phosphoric acid volatilizes at the time of kneading and forming to accelerate decomposition of the aliphatic polyester and the second polymer compound, resulting in the tendency of mechanical strength to decrease. The phosphorus content in the organic phosphoric acid compound as used herein means the mass ratio of elemental phosphorus to the total mass of the organic phosphoric acid compound. The phosphorus content can be measured using, for example, a fluorescent X-ray or the like.

Moreover, the content of the organic phosphoric acid compound is preferably selected so as to give a phosphorus content in the resin mold of 1% by mass or more on the basis of the total amount of the resin mold. When the phosphorus content in the resin mold is less than 1% by mass, flame retardancy and mechanical strength (particularly, impact-resistant strength) tends to become difficult to be compatible with each other. Further, the content of the organic phosphoric acid compound is preferably selected so as to give a phosphorus content of 20% by weight or less. When the phosphorus content in the resin mold exceeds 20% by mass, a phosphorus-containing gas is generated when the temperature of the use environment as well as the forming process increases, which causes firing in some cases.

In addition, the resin mold according to a second exemplary embodiment of the invention may further contain a flame retardant (hereinafter referred to as an "additional flame retardant" for convenience) other than the organic phosphoric acid compound, as long as its advantage is not impaired. The additional flame retardants include, for example, a phosphorus-based flame retardant other than the aforementioned organic phosphoric acid compound, a bromine-based flame retardant, a silicone-based flame retardant, an inorganic particle-based flame retardant and the like. From the viewpoint of the compatibility of flame retardancy and mechanical strength, the content of the additional flame retardant is preferably 10% by mass or less, and more preferably 5% by mass or less, on the basis of the total amount of the resin mold. It is particularly preferred that no additional flame retardant is contained.

The resin mold according to the second exemplary embodiment of the invention may be composed of only the aliphatic polyester, the second polymer compound and the organic phosphoric acid compound having a phosphorus content of about 20% by mass or more. However, it is preferred to further contain an elastomer such as an elastomer having a core-shell structure of a core and a shell, an elastomer of a structure having no shell or an elastomer of a branched structure having a side chain (hereinafter sometimes collectively simply referred as an "elastomer"), because mechanical strength and flame retardancy are compatible with each other in a higher level, and particularly, impact-resistant strength can be more improved. Materials for the core of the elastomer having a core-shell structure include butadiene, styrene, methyl methacrylate, acrylonitrile, vinyl acetate and the like. Further, materials for the shell include an alkyl acrylate, an alkyl methacrylate, a polysiloxane and the like. These can be appropriately selected depending on the kind of aliphatic polyester and second polymer compound. Modification of the core in the elastomer having a core-shell structure may be performed by graft polymerization, or by immersing the core in a solution in which a material for the shell is dissolved in a solvent. The average particle size of the elastomer is preferably from 0.5 µm to 50 µm, and more preferably from 2 µm to 20 µm. When the average particle size of the elastomer is less than 0.5 µm, the advantage of improving impact-resistant strength tends to become insufficient. Further, exceeding 50 µm results in the tendency of dispersibility of the elastomer in the resin mold to decrease, which sometimes rather causes a decrease in impact-resistant strength by adding the elastomer to the resin composition.

Further, the resin mold according to the second exemplary embodiment of the invention may further contain an additive such as a filler, an antioxidant, a toughening agent, a compatilizer, a weatherproofing agent or a hydrolysis-preventing agent, a catalyst or the like, as needed. The contents of these additives and the catalyst are each preferably 10% by mass or less on the basis of the total amount of the resin mold. The details of the additives and the catalyst are the same as described in the resin composition.

The resin mold according to the first and second exemplary embodiments of the invention can be applied to a wide range of uses. The uses of the resin mold of the invention include, specifically, electric and electronic parts and casings thereof, automobile parts, building materials such as wall paper and exterior materials, eating utensils, sheets, cushioning materials, fiber and the like. Above all, it is suitable for the electric and electronic parts and the casings which require high impact-resistant strength and flame retardancy and excellent resistance to hydrolysis, are used in large amounts to cause a high advantage of decreasing environmental load. The casings as used herein mean casings for home electric appliances, containers, electronic devices and the like. In particular, it is suitable for the casings of electronic devices, because excellent weather resistance is required for them.

When the casing is constituted using the resin mold according to this exemplary embodiment, the whole of the casing may be constituted by the resin mold according to this exemplary embodiment. However, it is preferred that a portion where performance such as plane impact strength is required is constituted by the resin mold according to this exemplary embodiment. In this case, portions other than the aforementioned portion may be constituted by a resin mold other than the resin mold according to this exemplary embodiment. Specifically, a front cover, a rear cover, a paper feed tray, a paper discharge tray, a platen and the like in the exterior of a printer, a copying machine, a facsimile and the like are preferably constituted by the resin mold according to this exemplary embodiment. On the other hand, an interior cover, a toner cartridge, a process cartridge and the like may be constituted either by the resin mold according to this exemplary embodiment or by a resin mold other than that.

The drawing is a view showing one embodiment of an image forming apparatus provided with a casing and parts constituted by the resin mold according to this exemplary embodiment, and an external perspective view of the forming apparatus viewed from the front. The image forming apparatus 100 of the drawing is provided with front covers 120a and 120b at the front of a main body device 110. These front covers 120a and 120b are openable and closable so that an operator can conduct an operation in the apparatus. Thereby, the operator can replenish a toner when it has been exhausted, exchange a exhausted process cartridge, or remove clogged paper when a paper jam has occurred in the apparatus. The drawing shows the apparatus in a state where the front covers 120a and 120b are opened.

On an upper surface of the main body device 110, there are provided an operation panel 130 to which various conditions relating to image formation, such as paper size and the number of prints, are entered by operations from an operator and a copy glass 132 on which a document to be read is disposed. Further, the main body device 110 is provided on an upper portion thereof with an automatic document conveying device 134 which can automatically convey the document onto the copy glass 132. Furthermore, the main body device 110 is provided with an image scanner which scans a document image disposed on the copy glass 132 to obtain image data expressing the document image. The image data obtained by this image scanner is sent to an image forming unit through a control part. The image scanner and the control part are housed in a casing 150 constituting a part of the main body device 110. Further, the image forming unit is provided in the casing 150 as a detachable process cartridge 142. The installation and removal of the process cartridge 142 becomes possible by turning an operating lever 144.

A toner container 146 is attached to the casing 150 of the main body device 110, and a toner can be replenished through a toner feed port. The toner housed in the toner container 146 is fed to a developing device.

On the other hand, a lower portion of the main body device 110 is provided with paper storage cassettes 140a, 140b and 140c. In the main body device 110, a plurality of conveying rollers composed of a pair of rollers are arranged, thereby forming a conveying pathway through which paper in the paper storage cassettes is conveyed to the image forming unit provided in an upper portion. Paper in each paper storage cassette is taken out sheet by sheet by a paper takeout mechanism disposed in the vicinity of an end portion of the conveying pathway, and sent out to the conveying pathway. Further, a side surface of the main body device 110 is provided a manual feed paper tray 136, and paper can also be fed therefrom.

Paper on which images have been formed by the image forming unit is successively conveyed to between two fixing rolls which are supported with the casing 152 constituting a part of the main body device 110 and brought into abutting contact with each other. The main body device 110 is provided with a plurality of discharge trays 138 on the opposite side of the side on which the paper tray 136 is provided, and the paper after image formation is discharged to these trays.

In the image forming apparatus 100, the front covers 120a and 120b frequently receive loads such as stress and shock in opening and closing, vibration at the time of image formation and heat generated in the image forming apparatus. Further, the process cartridge 142 frequently receives loads such as shock in loading and unloading, vibration at the time of image formation and heat generated in the image forming apparatus. Furthermore, the casing 150 and the casing 152 frequently receive loads such as vibration at the time of image formation and heat generated in the image forming apparatus. Accordingly, the resin mold according to this exemplary embodiment is suitably used as the front covers 120a and 120b of the image forming apparatus 100, the exterior of the process cartridge 142, the casing 150 and the casing 152.

(Method for Producing Resin Mold)

The method for producing a resin mold according to a first exemplary embodiment of the invention includes a first step of kneading a resin composition including an aliphatic polyester, a second polymer compound other than the aliphatic polyester, and an organic phosphoric acid compound having a phosphorus content of about 20% by mass or more under such conditions that the temperature of the resin composition is kept at about 220° C. or lower; and a second step of forming the kneaded product obtained in the first step to obtain the resin mold.

Further, the method for producing a resin mold according to a second exemplary embodiment of the invention includes a second step of forming the kneaded product obtained in the above-mentioned first step to obtain the resin mold in which the molecular weight distribution of the aliphatic polyester and the second polymer compound in the resin mold satisfies conditions represented by the following equation (1):

$$Mw(1)/Mn(1) \leq Mw(2)/Mn(2) \quad (1)$$

wherein $Mw(1)$ and $Mn(1)$ represent the weight average molecular weight and the number average molecular weight of the aliphatic polyester, respectively, and $Mw(2)$ and $Mn(2)$ represent the weight average molecular weight and the number average molecular weight of the second polymer compound, respectively.

Furthermore, in the method for producing a resin mold according to the second exemplary embodiment of the invention, in the above-mentioned second step, it is preferred that the molecular weight distribution of the second polymer compound in the resin mold satisfies conditions represented by the following equation (2):

$$Mw(2)/Mn(2) \leq 2.5 \quad (2)$$

wherein $Mw(2)$ and $Mn(2)$ represent the weight average molecular weight and the number average molecular weight of the above-mentioned second polymer compound, respectively.

In the production method according to the second exemplary embodiment, the weight average molecular weight and the number average molecular weight of the aliphatic polyester and the second polymer compound are changeable by passing through the first step and the second step. It is therefore preferred that the weight average molecular weight and the number average molecular weight of the aliphatic polyester and the second polymer compound contained in the resin mold is appropriately selected depending on the kneading conditions in the first step, the forming conditions in the second step, and the like. However, the weight average molecular weight and the number average molecular weight of the aliphatic polyester and the second polymer compound in the resin composition before kneading are not necessarily required to satisfy the conditions represented by the above-mentioned equations (1) and (2).

Further, in the production method according to the first exemplary embodiment and the second exemplary embodiment, it is preferred that the aliphatic polyester and the second polymer compound in the resin composition before kneading are previously coarsely pulverized to an average particle size ranging from 1 mm to 2 mm. When the average particle size of the aliphatic polyester and the second polymer exceeds 2 mm, so-called jamming of a screw occurs in a kneader to cause a tendency to increase torque. On the other hand, when the average particle size of the aliphatic polyester and the second polymer is less than 1 mm, the viscosity tends to increase.

Furthermore, when the desired resin mold contains an elastomer having a core-shell structure of a core derived from butadiene and a shell derived from an acrylic compound or further contains additives described above, these components can be incorporated into the resin composition subjected to kneading, in the first step.

In the first step, the temperature of the resin composition in kneading is about 220° C. or lower as described above, and preferably from about 80° C. to about 100° C. Kneading of the resin composition under such temperature conditions can sufficiently improve fluidity of such a kneaded product in a forming machine, even when the temperature of the kneaded product at the time of forming in the second step is about 220° C. or lower. Such an effect of improving fluidity of the kneaded product is presumed to be cause by the following reason. That is to say, the melting point of the aliphatic polyester is lower than the melting point of the second polymer compound, so that surfaces of particles of the second polymer compound are coated with the melted aliphatic polyester to form composite particles.

Further, forming methods in the second step include injection molding, extrusion molding, blow molding, heat press molding and the like. Of these, injection molding is suitable.

When the resin mold according to this exemplary embodiment is produced by injection molding, the kneaded product obtained in the first step may be put into an injection molding machine as a compound, or the kneaded product may be injection molded as it is after kneading in the first step.

In the production method according to the second exemplary embodiment, the forming conditions in the second step are not particularly limited, as long as the molecular weight distribution of the aliphatic polyester and the second polymer compound in the resin mold to be obtained satisfies the conditions represented by the above-mentioned equation (1), preferably by the above-mentioned equations (1) and (2). However, for example, in the case of injection molding, injection molding is performed under such conditions that the temperature of the kneaded product in the injection molding machine is kept preferably at about 220° C. or lower, more preferably at about 170° C. to about 220° C. When the temperature of the kneaded product in the injection molding machine is controlled, the temperature at an outlet port of the injection molding machine is preferably used as an index. Further, the cylinder temperature is preferably from 150° C. to 240° C., the mold temperature is preferably from 20° C. to 60° C., and the cooling time is preferably from 10 seconds to 120 seconds. Further, also in the production method according to the first exemplary embodiment, the above-mentioned conditions are preferably used as the forming conditions in the second step.

Here, it is extremely unexpectedly advantageous and useful for the production of the resin mold that injection molding can be performed in such a manner that the temperature of the kneaded product is kept at about 220° C. or lower, and that flame retardancy and mechanical strength are compatible with each other in the resin mold to be obtained by such injection molding.

That is to say, the aliphatic polyester such as polylactic acid can be injection molded at about 220° C. or lower, when used alone. However, when a polycarbonate or the like is mixed with the aliphatic polyester, fluidity significantly decreases to rapidly increase rotary torque of a forming machine, and usually, a resin material does not sufficiently spread in a mold due to lack of fluidity. It is therefore necessary to perform molding at a relatively high temperature (for example, 240° C. or higher) in order to secure the fluidity of the resin material. However, when the resin material further contains an organic phosphoric acid compound, the organic phosphoric acid compound decomposes by injection molding at high temperatures to accelerate hydrolysis of the aliphatic polyester. Accordingly, flame retardancy and mechanical strength are very difficult to be compatible with each other in the resin mold to be obtained.

In contrast, according to this exemplary embodiment, the fluidity of the kneaded product in the injection molding machine can be sufficiently secured, and on the other hand, decomposition of the organic phosphoric acid compound and hydrolysis of the aliphatic polyester can be substantially inhibited. It becomes therefore possible to allow mechanical strength and flame retardancy to be compatible with each other in the resin mold to be obtained. The reasons why such an excellent advantage is obtained is considered to be (i) an effect of increasing fluidity of the kneaded product by kneading in such a manner that the temperature of the resin composition is kept at about 220° C. or lower in the first step, (ii) a function of the organic phosphoric acid compound having a phosphorus content of about 20% by mass to about 50% by mass as a lubricant, and the like. Further, as described above, (iii) when the aliphatic polyester and the second polymer compound in the resin composition before kneading are previously coarsely pulverized to an average particle size ranging from 1 mm to 2 mm, such pulverization is also considered to contribute thereto.

EXAMPLES

The present invention will be illustrated in greater detail with reference to examples and comparative examples, but the invention should not be construed as being limited thereto.

Example A-1

A resin composition containing 32.2 parts by mass of polylactic acid (Lacea H-100, manufactured by Mitsui Chemicals, Inc., Mw/Mn=2.6) as the aliphatic polyester, 48.3 parts by mass of a polycarbonate (Panlite L1225Y, manufactured by Teijin Chemicals Ltd., Mw/Mn=2.1) as the second polymer compound, 10.0 parts by mass of ammonium polyphosphate (Exolit AP422, manufactured by Clariant K.K., phosphorus content: 28% by mass, Mw=120,000), 7.5 parts by mass of an elastomer having a core-shell structure including a core derived from butadiene and a shell derived from an acrylic compound (Metablen C233A, manufactured by Mitsubishi Rayon Co., Ltd.), 1.0 part by mass of a weatherproofing agent (Adekastab LA-29, manufactured by Adeka Corporation) and 1.0 part by mass of an antihydrolysis agent (Carbodilite LA-1, manufactured by Nisshinbo Industries, Inc.) is kneaded by a twin-screw kneader (Laboplast Mill, manufactured by Toyo Seiki Seisaku-Sho, Ltd.) in such a manner that the temperature of the resin composition is kept at 220° C. to prepare a compound of a kneaded product. Then, using the compound thus obtained, injection molding is performed under conditions of a cylinder temperature of 200° C. and a mold temperature of 60° C. by means of an injection molding machine (NEX 150, manufactured by Nissei Plastic Industrial Co., Ltd.) to obtain an ISO multipurpose dumbbell specimen (ISO 527) and an UL94 specimen (thickness: 2 mm) as resin molds. The temperature of the kneaded product in the vicinity of an outlet port of the injection molding machine at the time of injection molding is 220° C. The molecular weight distribution of the aliphatic polyester and the second polymer compound in the resin mold thus obtained is shown in Table 1

Then, using the resulting ISO multipurpose dumbbell specimen, Charpy notched impact strength and flexural strength are measured with an impact-resistant strength measuring instrument (DG-C, manufactured by Toyo Seiki Seisaku-Sho, Ltd.) and an Instron type tensile tester (Strograph V50, manufactured by Toyo Seiki Seisaku-Sho, Ltd.), respectively. Further, using the resulting UL94 specimen, an UL-V burning test is performed by a method based on UL-94. The results obtained are shown in Table 1.

Examples A-2 to A-16 and Comparative Examples
A-1 and A-2

In Examples A-2 to A-16 and Comparative Examples A-1 and A-2, kneading and injection molding are performed to obtain ISO multipurpose dumbbell specimens (ISO 527) and UL94 specimens (thickness: 2 mm) as resin molds in the same manner as in Example A-1 with the exception that the composition of the resin composition subjected to kneading is changed to the compositions shown in Tables 1 to 5, or that the temperature of the kneaded product at the time of injection molding is changed to the temperatures shown in Tables 1 to 5. The molecular weight distribution of the aliphatic polyesters and the second polymer compounds in the respective resin molds thus obtained is shown in Tables 1 to 5. Further, using the resulting ISO multipurpose dumbbell specimens, Charpy notched impact strength is measured with an impact-resistant strength measuring instrument (DG-C, manufactured by Toyo Seiki Seisaku-Sho, Ltd.). Furthermore, using the resulting UL94 specimens, an UL-V burning test is performed by a method based on UL-94. The results obtained are shown in Tables 1 to 5. In addition, the Mw/Mn of polyhydrobutyric acid (Biopole, manufactured by Monsanto Co., Ltd.) used as the aliphatic polyester in Example 8-A is 2.8 before kneading. Further, the Mw/Mn of an ABS resin (Clarastick GA704, manufactured by Nippon A&L Inc.) used as the second polymer compound in Example A-9 is 2.4 before kneading. Furthermore, in Example A-13, "HostflamAP422" (manufactured by clariant K.K., phosphorus content: 29% by mass, Mw=45,000) is used as ammonium polyphosphate.

TABLE 1

|  |  | Example A-1 | Example A-2 | Example A-3 | Example A-4 |
|---|---|---|---|---|---|
| Composition of Resin Composition | Polylactic Acid (Lacea H-100, manufactured by Mitsui Chemicals) | 32.2 | 28.2 | 40.25 | 30.2 |
|  | Polyhydrobutyric Acid (Biopole, manufactured by Monsanto) | — | — | — | — |
|  | Polycarbonate (Panlite L1225Y, manufactured by Teijin Chemicals) | 48.3 | 52.3 | 40.25 | 45.3 |

TABLE 1-continued

|  |  |  | Example A-1 | Example A-2 | Example A-3 | Example A-4 |
|---|---|---|---|---|---|---|
|  | ABS Resin (Clarastick GA704, manufactured by Nippon A&L) |  | — | — | — | — |
|  | Ammonium Polyphosphate (Exolit AP422, manufactured by Clariant) |  | 10.0 | 10.0 | 10.0 | 10.0 |
|  | Condensed Phosphate (PX-200, manufactured by Daihachi Chemical Industry) |  | — | — | — | — |
|  | Butadiene-Acrylic Elastomer (Metablen C233A, manufactured by Mitsubishi Rayon) |  | 7.5 | 7.5 | 7.5 | 7.5 |
|  | Butadiene-Siloxane Elastomer (Metablen S2000, manufactured by Mitsubishi Rayon) |  | — | — | — | — |
|  | Weatherproofing Agent (Adekastab LA-29, manufactured by Adeka) |  | 1.0 | 1.0 | 1.0 | 1.0 |
|  | Antihydrolysis Agent (Carbodilite LA-1, manufactured by Nisshinbo) |  | 1.0 | 1.0 | 1.0 | 1.0 |
| Temperature of Kneaded Product at the Time of Injection Molding (° C.) |  |  | 220 | 220 | 220 | 220 |
| Molecular Weight Distribution in Resin Mold | Aliphatic Polyester | Mw(1) | 45,000 | 44,000 | 43,000 | 45,000 |
|  |  | Mn(1) | 18,000 | 16,000 | 15,000 | 21,000 |
|  |  | Mw(1)/Mn(1) | 2.5 | 2.75 | 2.87 | 2.14 |
|  | Second Polymer Compound | Mw(2) | 20,000 | 21,500 | 22,000 | 21,500 |
|  |  | Mn(2) | 9,520 | 10,750 | 10,000 | 10,240 |
|  |  | Mw(2)/Mn(2) | 2.1 | 2.0 | 2.2 | 2.1 |
| Charpy Impact Strength (kJ/m$^2$) |  |  | 6.5 | 8.9 | 4.9 | 4.5 |
| Flame Retardancy (UL-V Test) |  |  | V-2 | V-2 | V-2 | V-2 |

TABLE 2

|  |  |  | Example A-5 | Example A-6 | Example A-7 | Example A-8 |
|---|---|---|---|---|---|---|
| Composition of Resin Composition | Polylactic Acid (Lacea H-100, manufactured by Mitsui Chemicals) |  | 26.2 | 32.4 | 33.6 | — |
|  | Polyhydrobutyric Acid (Biopole, manufactured by Monsanto) |  | — | — | — | 32.2 |
|  | Polycarbonate (Panlite L1225Y, manufactured by Teijin Chemicals) |  | 39.3 | 48.6 | 50.4 | 46.3 |
|  | ABS Resin (Clarastick GA704, manufactured by Nippon A&L) |  | — | — | — | — |
|  | Ammonium Polyphosphate (Exolit AP422, manufactured by Clariant) |  | 25.0 | 10.0 | 10.0 | 10.0 |
|  | Condensed Phosphate (PX-200, manufactured by Daihachi Chemical Industry) |  | — | — | — | — |
|  | Butadiene-Acrylic Elastomer (Metablen C233A, manufactured by Mitsubishi Rayon) |  | 7.5 | 7.5 | 5.0 | 7.5 |
|  | Butadiene-Siloxane Elastomer (Metablen S2000, manufactured by Mitsubishi Rayon) |  | — | — | — | — |
|  | Weatherproofing Agent (Adekastab LA-29, manufactured by Adeka) |  | 1.0 | 0.5 | 0.5 | 1.0 |
|  | Antihydrolysis Agent (Carbodilite LA-1, manufactured by Nisshinbo) |  | 1.0 | 1.0 | 0.5 | 1.0 |
| Temperature of Kneaded Product at the Time of Injection Molding (° C.) |  |  | 220 | 220 | 220 | 220 |
| Molecular Weight Distribution in Resin Mold | Aliphatic Polyester | Mw(1) | 43,000 | 45,000 | 44,000 | 48,000 |
|  |  | Mn(1) | 13,000 | 15,000 | 18,000 | 17,000 |
|  |  | Mw(1)/Mn(1) | 3.3 | 3.0 | 2.44 | 2.82 |
|  | Second Polymer Compound | Mw(2) | 21,500 | 20,000 | 22,200 | 21,550 |
|  |  | Mn(2) | 9,350 | 9,090 | 10,570 | 8,980 |
|  |  | Mw(2)/Mn(2) | 2.3 | 2.2 | 2.1 | 2.4 |
| Charpy Impact Strength (kJ/m$^2$) |  |  | 4.0 | 6.7 | 6.5 | 4.2 |
| Flame Retardancy (UL-V Test) |  |  | V-2 | V-2 | V-2 | V-2 |

TABLE 3

|  |  | Example A-9 | Example A-10 | Example A-11 | Example A-12 |
|---|---|---|---|---|---|
| Composition of Resin Composition | Polylactic Acid (Lacea H-100, manufactured by Mitsui Chemicals) | 32.2 | 32.2 | 32.2 | 52.8 |
|  | Polyhydrobutyric Acid (Biopole, manufactured by Monsanto) | — | — | — | — |
|  | Polycarbonate (Panlite L1225Y, manufactured by Teijin Chemicals) | — | 48.3 | 48.3 | 35.2 |

TABLE 3-continued

|  |  |  | Example A-9 | Example A-10 | Example A-11 | Example A-12 |
|---|---|---|---|---|---|---|
|  | ABS Resin (Clarastick GA704, manufactured by Nippon A&L) |  | 48.3 | — | — | — |
|  | Ammonium Polyphosphate (Exolit AP422, manufactured by Clariant) |  | 10.0 | 10.0 | 10.0 | 10.0 |
|  | Condensed Phosphate (PX-200, manufactured by Daihachi Chemical Industry) |  | — | — | — | — |
|  | Butadiene-Acrylic Elastomer (Metablen C233A, manufactured by Mitsubishi Rayon) |  | 7.5 | 7.5 | — | — |
|  | Butadiene-Siloxane Elastomer (Metablen S2000, manufactured by Mitsubishi Rayon) |  | — | — | 7.5 | — |
|  | Weatherproofing Agent (Adekastab LA-29, manufactured by Adeka) |  | 1.0 | 1.0 | 1.0 | 1.0 |
|  | Antihydrolysis Agent (Carbodilite LA-1, manufactured by Nisshinbo) |  | 1.0 | 1.0 | 1.0 | 1.0 |
| Temperature of Kneaded Product at the Time of Injection Molding (° C.) |  |  | 220 | 210 | 205 | 220 |
| Molecular Weight Distribution in Resin Mold | Aliphatic Polyester | Mw(1) | 44,000 | 42,000 | 46,000 | 48,000 |
|  |  | Mn(1) | 15,000 | 14,000 | 18,000 | 16,000 |
|  |  | Mw(1)/Mn(1) | 2.9 | 3.0 | 2.56 | 3.0 |
|  | Second Polymer Compound | Mw(2) | 20,550 | 20,000 | 22,200 | 23,000 |
|  |  | Mn(2) | 8,930 | 10,500 | 13,900 | 9,580 |
|  |  | Mw(2)/Mn(2) | 2.3 | 1.9 | 1.6 | 2.4 |
| Charpy Impact Strength (kJ/m$^2$) |  |  | 4.8 | 7.8 | 9.2 | 3.8 |
| Flame Retardancy (UL-V Test) |  |  | V-2 | V-2 | V-2 | V-2 |

TABLE 4

|  |  |  | Example A-13 | Example A-14 | Example A-15 |
|---|---|---|---|---|---|
| Composition of Resin Composition | Polylactic Acid (Lacea H-100, manufactured by Mitsui Chemicals) |  | 28.2 | 32.2 | 32.2 |
|  | Polyhydrobutyric Acid (Biopole, manufactured by Monsanto) |  | — | — | — |
|  | Polycarbonate (Panlite L1225Y, manufactured by Teijin Chemicals) |  | 52.3 | 48.3 | 48.3 |
|  | ABS Resin (Clarastick GA704, manufactured by Nippon A&L) |  | — | — | — |
|  | Ammonium Polyphosphate (Exolit AP422, manufactured by Clariant) |  | — | 10.0 | 10.0 |
|  | Ammonium Polyphosphate (Hostflam AP422, manufactured by Clariant) |  | 10.0 | — | — |
|  | Condensed Phosphate (PX-200, manufactured by Daihachi Chemical Industry) |  | — | — | — |
|  | Butadiene-Acrylic Elastomer (Metablen C233A, manufactured by Mitsubishi Rayon) |  | 7.5 | 7.5 | 7.5 |
|  | Butadiene-Siloxane Elastomer (Metablen S2000, manufactured by Mitsubishi Rayon) |  | — | — | — |
|  | Weatherproofing Agent (Adekastab LA-29, manufactured by Adeka) |  | 1.0 | 1.0 | 1.0 |
|  | Antihydrolysis Agent (Carbodilite LA-1, manufactured by Nisshinbo) |  | 1.0 | 1.0 | 1.0 |
| Temperature of Kneaded Product at the Time of Injection Molding (° C.) |  |  | 220 | 205 | 230 |
| Molecular Weight Distribution in Resin Mold | Aliphatic Polyester | Mw(1) | 45,000 | 43,000 | 37,000 |
|  |  | Mn(1) | 17,000 | 16,000 | 10,000 |
|  |  | Mw(1)/Mn(1) | 2.65 | 2.69 | 3.7 |
|  | Second Polymer Compound | Mw(2) | 22,500 | 22,000 | 18,220 |
|  |  | Mn(2) | 12,500 | 12,000 | 6,500 |
|  |  | Mw(2)/Mn(2) | 1.8 | 1.83 | 2.8 |
| Charpy Impact Strength (kJ/m$^2$) |  |  | 4.9 | 6.0 | 2.8 |
| Flame Retardancy (UL-V Test) |  |  | V-2 | V-2 | V-2 |

TABLE 5

|  |  | Example A-16 | Comparative Example A-1 | Comparative Example A-2 |
|---|---|---|---|---|
| Composition of Resin Composition | Polylactic Acid (Lacea H-100, manufactured by Mitsui Chemicals) | 32.2 | 32.2 | 80.5 |
|  | Polyhydrobutyric Acid (Biopole, manufactured by Monsanto) | — | — | — |

TABLE 5-continued

|  |  |  | Example A-16 | Comparative Example A-1 | Comparative Example A-2 |
|---|---|---|---|---|---|
|  | Polycarbonate (Panlite L1225Y, manufactured by Teijin Chemicals) |  | 48.3 | 48.3 | — |
|  | ABS Resin (Clarastick GA704, manufactured by Nippon A&L) |  | — | — | — |
|  | Ammonium Polyphosphate (Exolit AP422, manufactured by Clariant |  | 10.0 | — | 10.0 |
|  | Condensed Phosphate (PX-200, manufactured by Daihachi Chemical Industry) |  | 2.5 | 10.0 | — |
|  | Butadiene-Acrylic Elastomer (Metablen C233A, manufactured by Mitsubishi Rayon) |  | 7.5 | 7.5 | 7.5 |
|  | Butadiene-Siloxane Elastomer (Metablen S2000, manufactured by Mitsubishi Rayon) |  | — | — | — |
|  | Weatherproofing Agent (Adekastab LA-29, manufactured by Adeka) |  | 1.0 | 1.0 | 1.0 |
|  | Antihydrolysis Agent (Carbodilite LA-1, manufactured by Nisshinbo) |  | 1.0 | 1.0 | 1.0 |
| Temperature of Kneaded Product at the Time of Injection Molding (° C.) |  |  | 220 | 220 | 220 |
| Molecular Weight Distribution in Resin Mold | Aliphatic Polyester | Mw(1) | 45,000 | 40,000 | 38,000 |
|  |  | Mn(1) | 18,000 | 12,000 | 11,000 |
|  |  | Mw(1)/Mn(1) | 2.5 | 3.33 | 3.45 |
|  | Second Polymer Compound | Mw(2) | 20,000 | 17,500 | 16,500 |
|  |  | Mn(2) | 9,520 | 5,300 | 4,340 |
|  |  | Mw(2)/Mn(2) | 2.1 | 3.3 | 3.8 |
| Charpy Impact Strength (kJ/m$^2$) |  |  | 6.5 | 2.4 | 2.2 |
| Flame Retardancy (UL-V Test) |  |  | V-2 | Not V-2 | Not V-2 |

Further, for each of the specimens obtained in Example A-1 and Example A-16, a solvent-resistant test is performed. Specifically, three kinds of solvents and three kinds of oils shown in Table 6 are applied to the above-mentioned multipurpose dumbbell specimen, and pressure is applied to a center portion of the specimen from a surface opposite to the surface to which the solvent or oil has been applied, with both ends of the specimen fixed under conditions of a temperature of 25° C. and a humidity of 55% to give a strain of 0.5%. After 20 hours, the presence or absence of a crack is evaluated. The results thereof are shown in Table 6.

Mill, manufactured by Toyo Seiki Seisaku-Sho, Ltd.) in such a manner that the temperature of the resin composition is kept at 210° C. to prepare a compound of a kneaded product.

$$—[(HPO_3)NH_3]_n— \quad (A)$$

Then, using the compound thus obtained, injection molding is performed under conditions of a cylinder temperature of 210° C. and a mold temperature of 40° C. by means of an injection molding machine (NEX 150, manufactured by Nissei Plastic Industrial Co., Ltd.) to obtain an ISO multipurpose

TABLE 6

|  | Water | Isopropyl Alcohol | Benzene | Amino-Modified Oil "KF8009" (manufactured by Shin-Etsu Silicone, trade name) | Mineral Oil "Tellus" (manufactured by Showa Shell Sekiyu, trade name) | Press Oil "Sunpress S304" (manufactured by Sugimura Chemical, trade name) |
|---|---|---|---|---|---|---|
| Example A-1 | Absence | Presence | Presence | Presence | Presence | Presence |
| Example A-16 | Absence | Absence | Absence | Absence | Absence | Absence |

Example B-1

A resin composition containing 35.5 parts by mass of polylactic acid (Terramac TE-4000, manufactured by Unitika Ltd.) as the aliphatic polyester, 54.0 parts by mass of a polycarbonate (Panlite L1225Y, manufactured by Teijin Chemicals Ltd.) as the second polymer compound, 10.0 parts by mass of ammonium polyphosphate represented by the following formula (A) (the number of repeating units n=800, phosphorus content: 29% by mass) as the organic phosphoric acid compound and 0.5 part by mass of an antihydrolysis agent (carbodilite LA-1, manufactured by Nisshinbo Industries, Inc.) is kneaded by a twin-screw kneader (Laboplast dumbbell specimen (ISO 527) and an UL94 specimen (thickness: 2 mm) as resin molds. The temperature of the kneaded product in the vicinity of an outlet port of the injection molding machine at the time of injection molding is 210° C.

Then, using the resulting ISO multipurpose dumbbell specimens Charpy notched impact strength and flexural strength are measured with an impact-resistant strength measuring instrument (DG-C, manufactured by Toyo Seiki Seisaku-Sho, Ltd.) and an Instron type tensile tester (Strograph V50, manufactured by Toyo Seiki Seisaku-Sho, Ltd.), respectively. Further, using the resulting UL94 specimen, an UL-V burning test is performed by a method based on UL-94. The results obtained are shown in Table 7.

Examples B-2 to B-12 and Comparative Examples B-1 to B-3

In Examples B-2 to B-12 and Comparative Examples B-1 to B-3, kneading and injection molding are performed to obtain ISO multipurpose dumbbell specimens (ISO 527) and UL94 specimens (thickness: 2 mm) as resin molds in the same manner as in Example B-1 with the exception that the composition of the resin composition subjected to kneading is changed to the compositions shown in Tables 7 to 10, or that the temperature of the kneaded product at the time of injection molding is changed to the temperatures shown in Tables 7 to 10. Using the resulting ISO multipurpose dumbbell specimens, Charpy notched impact strength and flexural strength are measured with an impact-resistant strength measuring instrument (DG-C, manufactured by Toyo Seiki Seisaku-Sho, Ltd.) and an Instron type tensile tester (Strograph V50, manufactured by Toyo Seiki Seisaku-Sho, Ltd.), respectively. Further, using the resulting UL94 specimens, an UL-V burning test is performed by a method based on UL-94. The results obtained are shown in Tables 7 to 10.

In addition, ammonium polyphosphate used as the organic phosphoric acid compound in Example B-2 has a number n of repeating units in the above-mentioned formula (A) of 1,500, a molecular weight of 145,000 and a phosphorus content of 28% by mass. Further, ammonium polyphosphate used as the organic phosphoric acid compound in Example B-3 is represented by the following formula (B), wherein the number m of repeating units is 1120, the Mw is 100,000, and the phosphorus content is 27% by mass.

$$—[(CH_3PO_3)NH_3]_m— \quad (B)$$

Furthermore, ammonium polyphosphate used as the organic phosphoric acid compound in Example B-11 has a number n of repeating units in the above-mentioned formula (A) of 720, a molecular weight of 70,000 and a phosphorus content of 25% by mass. Moreover, ammonium polyphosphate used as the organic phosphoric acid compound in Example B-12 has a number n of repeating units in the above-mentioned formula (A) of 1,500, a molecular weight of 160,000 and a phosphorus content of 20% by mass.

TABLE 7

| | | Example B-1 | Example B-2 | Example B-3 | Example B-4 |
|---|---|---|---|---|---|
| Composition of Resin Composition | Polylactic Acid (Terramac TE-4000, manufactured by Unitika) | 35.5 | 35.5 | 35.5 | 37.5 |
| | Polybutylene Succinate (Bionole #3000, manufactured by Showa Highpolymer) | — | — | — | — |
| | Polycarbonate (Panlite L1225Y, manufactured by Teijin Chemicals) | 54.0 | 54.0 | 54.0 | 57.0 |
| | ABS Resin (Clarastick GA704, manufactured by Nippon A&L) | — | — | — | — |
| | Ammonium Polyphosphate (n = 800, molecular weight: 90,000 in formula (A)) | 10.0 | — | — | 5.0 |
| | Ammonium Polyphosphate (n = 1500, molecular weight: 145,000 in formula (A)) | — | 10.0 | — | — |
| | Ammonium Polyphosphate (n = 720, molecular weight: 70,000 in formula (A)) | — | — | — | — |
| | Ammonium Polyphosphate (n = 1500, molecular weight: 160,000 in formula (A)) | — | — | — | — |
| | Ammonium Polyphosphate (n = 1120, molecular weight: 110,000 in formula (B)) | — | — | 10.0 | — |
| | Condensed Phosphate (PX-200, manufactured by Daihachi Chemical Industry) | — | — | — | — |
| | Butadiene-Acrylic Elastomer (Metablen C233A, manufactured by Mitsubishi Rayon) | — | — | — | — |
| | Butadiene-Acrylic Elastomer (Metablen E901, manufactured by Mitsubishi Rayon) | — | — | — | — |
| | Antihydrolysis Agent (Carbodilite LA-1, manufactured by Nisshinbo) | 0.5 | 0.5 | 0.5 | 0.5 |
| Temperature of Kneaded Product at the Time of Injection Molding (° C.) | | 210 | 210 | 210 | 210 |
| Charpy Impact Strength (kJ/m$^2$) | | 6.8 | 6.6 | 6.7 | 6.5 |
| Flexural Modulus (MPa) | | 2,600 | 2,800 | 2,800 | 2,500 |
| Flame Retardancy (UL-V Test) | | V-2 | V-2 | V-2 | V-2 |

TABLE 8

| | | Example B-5 | Example B-6 | Example B-7 | Example B-8 |
|---|---|---|---|---|---|
| Composition of Resin Composition | Polylactic Acid (Terramac TE-4000, manufactured by Unitika) | 33.5 | 31.5 | 33.5 | 32.5 |
| | Polybutylene Succinate (Bionole #3000, manufactured by Showa Highpolymer) | — | — | — | — |
| | Polycarbonate (Panlite L1225Y, manufactured by Teijin Chemicals) | 51.0 | 48.0 | 51.0 | 49.0 |
| | ABS Resin (Clarastick GA704, manufactured by Nippon A&L) | — | — | — | — |
| | Ammonium Polyphosphate (n = 800, molecular weight: 90,000 in formula (A)) | 15.0 | 20.0 | 10.0 | 10.0 |

TABLE 8-continued

|  |  | Example B-5 | Example B-6 | Example B-7 | Example B-8 |
|---|---|---|---|---|---|
|  | Ammonium Polyphosphate (n = 1500, molecular weight: 145,000 in formula (A)) | — | — | — | — |
|  | Ammonium Polyphosphate (n = 720, molecular weight: 70,000 in formula (A)) | — | — | — | — |
|  | Ammonium Polyphosphate (n = 1500, molecular weight: 160,000 in formula (A)) | — | — | — | — |
|  | Ammonium Polyphosphate (n = 1120, molecular weight: 110,000 in formula (B)) | — | — | — | — |
|  | Condensed Phosphate (PX-200, manufactured by Daihachi Chemical Industry) | — | — | — | — |
|  | Butadiene-Acrylic Elastomer (Metablen C233A, manufactured by Mitsubishi Rayon) | — | — | 5.0 | 8.0 |
|  | Butadiene-Acrylic Elastomer (Metablen E901, manufactured by Mitsubishi Rayon) | — | — | — | — |
|  | Antihydrolysis Agent (Carbodilite LA-1, manufactured by Nisshinbo) | 0.5 | 0.5 | 0.5 | 0.5 |
| Temperature of Kneaded Product at the Time of Injection Molding (° C.) | | 210 | 210 | 210 | 210 |
| Charpy Impact Strength (kJ/m²) | | 6.5 | 6.4 | 7.9 | 8.2 |
| Flexural Modulus (MPa) | | 2,600 | 2,800 | 2,400 | 2,500 |
| Flame Retardancy (UL-V Test) | | V-2 | V-2 | V-2 | V-2 |

TABLE 9

|  |  | Example B-9 | Example B-10 | Example B-11 | Example B-12 |
|---|---|---|---|---|---|
| Composition of Resin Composition | Polylactic Acid (Terramac TE-4000, manufactured by Unitika) | — | 32.5 | 35.5 | 35.5 |
|  | Polybutylene Succinate (Bionole #3000, manufactured by Showa Highpolymer) | 32.5 | — | — | — |
|  | Polycarbonate (Panlite L1225Y, manufactured by Teijin Chemicals) | 49.0 | — | 54.0 | 54.0 |
|  | ABS Resin (Clarastick GA704, manufactured by Nippon A&L) | — | 49.0 | — | — |
|  | Ammonium Poly phosphate (n = 800, molecular weight: 90,000 in formula (A)) | 10.0 | 10.0 | — | — |
|  | Ammonium Polyphosphate (n = 1500, molecular weight: 145,000 in formula (A)) | — | — | — | — |
|  | Ammonium Polyphosphate (n = 720, molecular weight 70,000 in formula (A)) | — | — | 10.0 | — |
|  | Ammonium Polyphosphate (n = 1500, molecular weight: 160,000 in formula (A)) | — | — | — | 10.0 |
|  | Ammonium Polyphosphate (n = 1120, molecular weight: 110,000 in formula (B)) | — | — | — | — |
|  | Condensed Phosphate (PX-200, manufactured by Daihachi Chemical Industry) | — | — | — | — |
|  | Butadiene-Acrylic Elastomer (Metablen C233A, manufactured by Mitsubishi Rayon) | 8.0 | — | — | — |
|  | Butadiene-Acrylic Elastomer (Metablen E901, manufactured by Mitsubishi Rayon) | — | 8.0 | — | — |
|  | Antihydrolysis Agent (Carbodilite LA-1, manufactured by Nisshinbo) | 0.5 | 0.5 | 0.5 | 0.5 |
| Temperature of Kneaded Product at the Time of Injection Molding (° C.) | | 210 | 210 | 210 | 210 |
| Charpy Impact Strength (kJ/m²) | | 8.2 | 8.1 | 6.0 | 6.0 |
| Flexural Modulus (MPa) | | 2,400 | 2,400 | 2,000 | 2,900 |
| Flame Retardancy (UL-V Test) | | V-2 | V-2 | V-2 | V-2 |

TABLE 10

|  |  | Comparative Example B-1 | Comparative Example B-2 | Comparative Example B-3 |
|---|---|---|---|---|
| Composition of Resin Composition | Polylactic Acid (Terramac TE-4000, manufactured by Unitika) | 35.5 | 30.5 | 70.0 |
|  | Polybutylene Succinate (Bionole #3000, manufactured by Showa Highpolymer) | — | — | — |
|  | Polycarbonate (Panlite L1225Y, manufactured by Teijin Chemicals) | 54.0 | 49.0 | — |
|  | ABS Resin (Clarastick GA704, manufactured by Nippon A&L) | — | — | — |
|  | Ammonium Polyphosphate | — | — | 30.0 |

TABLE 10-continued

|  | Comparative Example B-1 | Comparative Example B-2 | Comparative Example B-3 |
|---|---|---|---|
| (n = 800, molecular weight: 90,000 in formula (A)) Ammonium Polyphosphate | — | — | — |
| (n = 1500, molecular weight: 145,000 In formula (A)) Ammonium Polyphosphate | — | — | — |
| (n = 720, molecular weight: 70,000 in formula (A)) Ammonium Polyphosphate | — | — | — |
| (n = 1500, molecular weight: 160,000 in formula (A)) Ammonium Polyphosphate | — | — | — |
| (n = 1120, molecular weight: 110,000 in formula (B)) Condensed Phosphate | 10.0 | 20.0 | — |
| (PX-200, manufactured by Daihachi Chemical Industry) Butadiene-Acrylic Elastomer | — | — | — |
| (Metablen C233A, manufactured by Mitsubishi Rayon) Butadiene-Acrylic Elastomer | — | — | — |
| (Metablen E901, manufactured by Mitsubishi Rayon) Antihydrolysis Agent | 0.5 | 0.5 | — |
| (Carbodilite LA-1, manufactured by Nisshinbo) |  |  |  |
| Temperature of Kneaded Product at the Time of Injection Molding (° C.) | 210 | 210 | 210 |
| Charpy Impact Strength (kJ/m$^2$) | 2.2 | 0.7 | 0.5 |
| Flexural Modulus (MPa) | 2,400 | 2,500 | 3,000 |
| Flame Retardancy (UL-VTest) | Not V-2 | V-2 | Not V-2 |

Example C-1

An ISO multipurpose dumbbell specimen and an UL94 specimen are obtained in the same manner as in Example A-1 with the exception that 2.0 parts by mass of carbon nanotube (manufactured by Frontier Carbon Corporation) is further added.

Then, using the resulting ISO multipurpose dumbbell specimen, the flexural breaking strain at a temperature of 25° C. and a humidity of 55% is measured with a bending tester (Strograph VE, manufactured by Toyo Seiki Seisaku-Sho, Ltd.) by a method based on ISO 178. Further, the ISO multipurpose dumbbell specimen is allowed to stand under the circumstance of a temperature of 65° C. and a humidity of 85% for 1,000 hours, and then, the flexural breaking strain is measured in the same manner as described above.

Furthermore, using the resulting ISO multipurpose dumbbell specimen, a steel ball drop test is performed under the same conditions as in the measurement of the flexural breaking strain, wherein a steel ball having a diameter of 50 mm and a weight of 500 g is dropped onto the specimen from a height of 1,300 mm to observe the presence or absence of the occurrence of a crack. Moreover, this specimen is crushed and repelletized, and a specimen is prepared again under the same conditions as described above. For the resulting specimen, the steel ball drop test is performed at a temperature of 25° C. and a humidity of 55% to evaluate recyclability.

In addition, using the resulting UL94 specimen, the UL-V burning test is performed by a method based on UL-94. The results obtained are shown in Table 11. In Table 11, the results of Example A-1 are also shown together for the purpose of reference.

Example C-2

In Example C-2, an ISO multipurpose dumbbell specimen and an UL94 specimen are obtained in the same manner as in Example A-1 with the exception that 5.0 parts by mass of carbon nanotube (manufactured by Frontier Carbon Corporation) is further added. Using the resulting ISO multipurpose dumbbell specimen and UL94 specimen, the evaluation is made in the same manner as in Example C-1. The results obtained are shown in Table 11.

Example C-3

In Example C-3, an ISO multipurpose dumbbell specimen and an UL94 specimen are obtained in the same manner as in Example A-1 with the exception that 5.0 parts by mass of fullerene (C60) (manufactured by Frontier Carbon Corporation) is further added. Using the resulting ISO multipurpose dumbbell specimen and UL94 specimen, the evaluation is made in the same manner as in Example C-1. The results obtained are shown in Table 11.

TABLE 11

|  |  | Example A-1 | Example C-1 | Example C-2 | Example C-3 |
|---|---|---|---|---|---|
| Composition of Resin Composition | Polylactic Acid (Lacea H-100, manufactured by Mitsui Chemicals) | 32.2 | 32.2 | 32.2 | 32.2 |
|  | Polyhydrobutyric Acid (Biopole, manufactured by Monsanto) | — | — | — | — |
|  | Polycarbonate (Panlite L1225Y, manufactured by Teijin Chemicals) | 48.3 | 48.3 | 48.3 | 48.3 |
|  | ABS Resin (Clarastick GA704, manufactured by Nippon A&L) | — | — | — | — |
|  | Ammonium Polyphosphate (Exolit AP422, manufactured by Clariant | 10.0 | 10.0 | 10.0 | 10.0 |

TABLE 11-continued

|  |  | Example A-1 | Example C-1 | Example C-2 | Example C-3 |
|---|---|---|---|---|---|
|  | Butadiene-Acrylic Elastomer (Metablen C233A, manufactured by Mitsubishi Rayon) | 7.5 | 7.5 | 7.5 | 7.5 |
|  | Weatherproofing Agent (Adekastab LA-29, manufactured by Adeka) | 1.0 | 1.0 | 1.0 | 1.0 |
|  | Antihydrolysis Agent (Carbodilite LA-1, manufactured by Nisshinbo) | 1.0 | 1.0 | 1.0 | 1.0 |
|  | Carbon Nanotube (manufactured by Frontier Carbon) | — | 2.0 | 5.0 | — |
|  | Fullerene (C60) (manufactured by Frontier Carbon) | — | — | — | 5.0 |
| Flexural Breaking Strain | Temerature: 25° C., humidity: 55% | 10 or more | 10 or more | 10 or more | 10 or more |
|  | Temerature: 65° C., humidity: 85% | 8.2 | 10 or more | 10 or more | 10 or more |
| Steel Ball Drop Test | Temerature: 25° C., humidity: 55% | Not occurred | Not occurred | Not occurred | Not occurred |
|  | Temerature: 65° C., humidity: 85% | Occurred | Not occurred | Not occurred | Not occurred |
|  | After recycle | Occurred | Not occurred | Not occurred | Not occurred |
| Flame Retardancy (UL-V Test) |  | V-2 | V-0 | V-0 | V-0 |

What is claimed is:

1. A resin composition comprising:
an aliphatic polyester;
a second polymer compound other than the aliphatic polyester; and
an organic phosphoric acid compound that has a phosphorus content of about 20% by mass; wherein
the aliphatic polyester and the second polymer compound have a molecular weight distribution satisfying a condition represented by a following equation (1):

$$Mw(1)/Mn(1) \geqq Mw(2)/Mn(2) \quad (1)$$

wherein
Mw(1) and Mn(1) represent a weight average molecular weight and a number average molecular weight of the aliphatic polyester, respectively, and
Mw(2) and Mn(2) represent a weight average molecular weight and a number average molecular weight of the second polymer compound, respectively.

2. The resin composition according to claim 1, wherein the organic phosphoric acid compound has a molecular weight of from about 80,000 to about 150,000.

3. The resin composition according to claim 1, wherein the organic phosphoric acid compound is an ammonium polyphosphate.

4. The resin composition according to claim 3, wherein the ammonium polyphosphate has a repeating unit number of about 800 or more.

5. The resin composition according to claim 1, further comprising:
an elastomer.

6. The resin composition according to claim 5, wherein the elastomer has a core-shell structure that comprises a core derived from butadiene and a shell derived from an acrylic compound.

7. The resin composition according to claim 1, wherein the aliphatic polyester is a polylactic acid.

8. The resin composition according to claim 1, wherein the second polymer compound is at least one selected from the group consisting of a polycarbonate and an acrylonitrile-butadiene-styrene resin.

9. The resin composition according to claim 1, further comprising:
a compound represented by a following general formula (I):

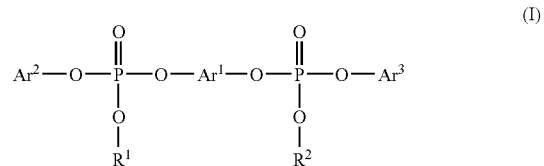

wherein
$Ar^1$ represents a substituted or unsubstituted arylene group, a substituted or unsubstituted biphenylene group or a substituted or unsubstituted bisphenol-typed arylene group,
$Ar^2$ and $Ar^3$ each independently represents a substituted or unsubstituted aryl group, and
$R^1$ and $R^2$ each independently represents a substituted or unsubstituted alkyl group having 1 to 10 carbon atoms or a substituted or unsubstituted aryl group.

10. A resin mold comprising:
the resin composition according to claim 1.

11. A method for producing a resin mold, the method comprising:
kneading a resin composition under a condition that a temperature of the resin composition is kept at about 220° C. or lower, the resin composition comprising an aliphatic polyester, a second polymer compound other than said aliphatic polyester, and an organic phosphoric acid compound having a phosphorus content of about 20% by mass or more; and
molding the kneaded resin composition to obtain the resin mold;
wherein
the aliphatic polyester and the second polymer compound in the resin mold have a molecular weight distribution satisfying a condition represented by a following equation (1):

$$Mw(1)/Mn(1) \geqq Mw(2)/Mn(2) \quad (1)$$

wherein

Mw(1) and Mn(1) represent a weight average molecular weight and a number average molecular weight of the aliphatic polyester, respectively, and Mw(2) and Mn(2) represent a weight average molecular weight and a number average molecular weight of the second polymer compound, respectively.

12. The method according to claim 11, wherein the molding of the kneaded resin composition is a injection molding performed under a condition that a temperature of the kneaded resin composition in an injection molding machine is kept at about 220° C. or lower.

* * * * *